United States Patent
Yoshida

(10) Patent No.: US 7,256,797 B2
(45) Date of Patent: Aug. 14, 2007

(54) IMAGE PROCESSING DEVICE WITH SYNCHRONIZED SPRITE RENDERING AND SPRITE BUFFER

(75) Inventor: Yoshiji Yoshida, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 64 days.

(21) Appl. No.: 10/766,636

(22) Filed: Jan. 28, 2004

(65) Prior Publication Data

US 2004/0189678 A1 Sep. 30, 2004

(30) Foreign Application Priority Data

Jan. 31, 2003 (JP) ............................ P2003-023444
Jan. 31, 2003 (JP) ............................ P2003-023445

(51) Int. Cl.
*G09G 5/00* (2006.01)
*G06F 13/00* (2006.01)

(52) U.S. Cl. ...................... 345/619; 345/629; 345/683; 345/950; 345/536

(58) Field of Classification Search ................ 345/619, 345/950, 530, 545, 547, 555, 672–684
See application file for complete search history.

(56) References Cited

U.S. PATENT DOCUMENTS

| | | | |
|---|---|---|---|
| 4,672,541 A * | 6/1987 | Bromley et al. ................ 463/3 |
| 5,319,786 A * | 6/1994 | Yamamura .................. 345/564 |
| 5,345,252 A * | 9/1994 | Hannah ....................... 345/162 |
| 5,361,387 A * | 11/1994 | Millar et al. ................. 345/543 |
| 5,574,836 A * | 11/1996 | Broemmelsiek ............. 345/427 |
| 5,634,850 A * | 6/1997 | Kitahara et al. ............. 463/33 |
| 5,793,351 A * | 8/1998 | Leach ......................... 345/683 |
| 5,818,466 A * | 10/1998 | Ryu ............................ 345/573 |

(Continued)

FOREIGN PATENT DOCUMENTS

JP 59111067 A * 6/1984

(Continued)

OTHER PUBLICATIONS

Giloi, Wolfgang K. Interactive Computer Graphics: Data Structures, Algorithms, Languages. Prentice Hall, 1978, pp. 246-248.*
C. Witzig and S. Adler. "E787 Technical Note #264: The E787 UNIX Based Event Buffer Manager". 8th Conf. on Real-Time Apps. in Nuclear, Particle, and Plasma Physics. Jun. 8-11, 1993. Vancover, Canada.*

(Continued)

*Primary Examiner*—Mark Zimmerman
*Assistant Examiner*—Eric Woods
(74) *Attorney, Agent, or Firm*—Pillsbury Winthrop Shaw Pittman LLP

(57) ABSTRACT

An image processing device comprises a decoder, a sprite buffer interface, and a sprite buffer as well as a rendering engine, a frame buffer interface, and a frame buffer, which is characterized by synchronizing the write timing for the sprite buffer with the read timing for the frame buffer. That is, the decoder decodes compressed image data to restore original image data before compression. The sprite buffer interface writes the decoded data (i.e., sprite pattern data) into the sprite buffer, from which the sprite pattern data are read and supplied to the rendering engine. The rendering engine performs a prescribed rendering process (e.g., magnification, reduction, rotation, deformation, etc.) on the sprite pattern data, which are then written into the frame buffer. A display controller reads rendering-completed data (i.e., display data) from the frame buffer so as to output them to a display.

13 Claims, 7 Drawing Sheets

U.S. PATENT DOCUMENTS

| | | | |
|---|---|---|---|
| 5,886,701 A * | 3/1999 | Chauvin et al. | 345/418 |
| 5,892,521 A * | 4/1999 | Blossom et al. | 345/501 |
| 5,977,977 A * | 11/1999 | Kajiya et al. | 345/418 |
| 6,313,844 B1 * | 11/2001 | Yamashita | 345/531 |
| 6,326,964 B1 * | 12/2001 | Snyder et al. | 345/419 |
| 2003/0026343 A1 * | 2/2003 | Kim et al. | 375/240.27 |
| 2003/0214506 A1 * | 11/2003 | Koselj et al. | 345/519 |
| 2005/0024369 A1 * | 2/2005 | Xie | 345/547 |
| 2005/0078101 A1 * | 4/2005 | Shigeta | 345/204 |

FOREIGN PATENT DOCUMENTS

| | | | |
|---|---|---|---|
| JP | 03249888 A * | 11/1991 | |
| JP | 07-072835 H | 3/1995 | |
| JP | 07-104723 H | 4/1995 | |
| JP | 07-282269 H | 10/1995 | |
| JP | 10-149149 H | 6/1998 | |
| JP | 2002-06810 | 1/2002 | |
| JP | 2002-112263 | 4/2002 | |
| JP | 2002-132237 | 5/2002 | |
| JP | 2002-341859 | 11/2002 | |
| JP | 2002341859 A * | 11/2002 | |

OTHER PUBLICATIONS

JP 2002-341859, translation of patent.*
Official Action from Japanese Patent Office (Notice of Rejection) on Japanese Patent Application No. 2003-23444 dated Mar. 14, 2006, 3-pgs.
Official Action from Japanese Patent Office (Notice of Rejection) on Japanese Patent Application No. 2003-23445 dated Mar. 14, 2006, 3-pgs.
Japanese Patent Office, Office Action (2003-023444), Sep. 6, 2005.
Japanese Patent Office, Office Action (2003-023445), Sep. 6, 2005.

* cited by examiner

Prior Art

IMAGE PROCESSING DEVICE WITH SYNCHRONIZED SPRITE RENDERING AND SPRITE BUFFER

BACKGROUND OF THE INVENTION

1. Field of the Invention

This invention relates to image processing devices for drawing pictures and images on computer screens in association with sprites and rendering in image processing.

This application claims priority on Japanese Patent Application No. 2003-23444 and Japanese Patent Application No. 2003-23445, the contents of which are incorporated herein by reference.

2. Description of the Related Art

Conventionally, graphical displays using sprites have been frequently used in playing video games and television games as well as other games such as 'pachinko' (a Japanese form of pinball). FIG. 7 is a block diagram showing the overall constitution of an image display device using sprites in image processing, wherein reference numeral 1 designates a central processing unit (CPU), 2 designates an image processing device, 3 designates a pattern read-only memory (ROM) for storing compressed patterns of sprites, and 4 designates a display such as a liquid crystal display. Upon reception of instructions from the CPU 1, the image processing device 2 reads sprite patterns from the pattern ROM 3 so as to decode (e.g., expand) the read sprite patterns, which are thus restored to 'original' sprite patterns before compression and are expanded in a sprite buffer (not shown) internally arranged therein. The 'decoded' sprite patterns are read from the sprite buffer and are then subjected to rendering processes such as magnification (or enlargement), reduction, rotation, and deformation, so that they are drawn in a frame buffer arranged internally of the image processing device 2. Thereafter, the 'drawn' pattern data are read out in synchronization with horizontal and vertical scanning timings and are output to the display 4. Conventionally-known technologies regarding the aforementioned display processing using sprites are disclosed in various documents such as Japanese Patent Application Publication No. 2002-16810, Japanese Patent Application Publication No. 2002-112263, and Japanese Patent Application Publication No. 2002-341859.

The conventionally-known image processing device is designed to perform a process for expanding a sprite pattern in the sprite buffer and a rendering process regarding the expanded sprite pattern, thus actualizing synchronization on drawing of an image at a prescribed location of the frame buffer. For this reason, one of these processes whose processing speed is relatively low may cause a bottleneck in image processing; and this reduces a drawing ability in processing.

SUMMARY OF THE INVENTION

It is an object of the invention to provide an image processing device that can improve a drawing ability in processing.

An image processing device of this invention basically comprises a decoder, a sprite buffer interface, and a sprite buffer with respect to sprite pattern data as well as a rendering engine, a frame buffer interface, and a frame buffer with respect to image data to be displayed on a display screen.

In order to draw an image in association with the frame buffer, it is necessary to read sprite pattern data from the sprite buffer, wherein an expansion access for the sprite buffer is given a first priority in order not to unexpectedly break a decoding process in progress in the decoder, so that sprite pattern data are read from the sprite buffer during a prescribed time period in which an expansion access is not made with respect to the sprite buffer. Therefore, it is not possible to draw an image in association with the frame buffer during an expansion access period of the sprite buffer. In addition, a display access (or a read access) for the frame buffer is given a first priority in order not to cause noise on the display screen. Therefore, it is not possible to draw an image in association with the frame buffer during a display access period of the frame buffer. Such an inability to execute drawing using the frame buffer during both of the expansion access period of the sprite buffer and the display access period of the frame buffer deteriorates an image processing ability in drawing images on the display screen. It may be possible to additionally provide a buffer memory for temporarily storing sprite pattern data read from the sprite buffer during the display access period of the frame buffer. However, this unnecessarily increases the total storage capacity of the buffer memory installed in the image processing device, which is an unrealistic solution in improvement of image processing.

This invention solves the aforementioned drawback by synchronizing the write timing for the sprite buffer with the read timing for the frame buffer. Specifically, the decoder decodes compressed image data, which are thus restored to original image data before compression. The sprite buffer interface writes the decoded image data (i.e., sprite pattern data) into the sprite buffer, from which the sprite pattern data are read and supplied to the rendering engine. The rendering engine performs a prescribed rendering process (e.g., magnification, reduction, rotation, deformation, etc.) on the sprite pattern data, which are then written into the frame buffer. A display controller reads rendering-completed data (i.e., display data) from the frame buffer so as to output them to a display.

In the above, the sprite buffer is constituted as a FIFO memory on which read/write controls are performed. This makes the decoding process of the decoder and the rendering process of the rendering engine to be asynchronous with each other; thus, it is possible to noticeably improve an image processing ability in drawing images on the display screen.

In addition, the frame buffer interface reads display data from the frame buffer in synchronization with the timing of writing sprite pattern data into the sprite buffer. This increases a drawing-enable time period for the frame buffer; thus, it is possible to noticeably improve an image processing ability in drawing images on the display screen.

BRIEF DESCRIPTION OF THE DRAWINGS

These and other objects, aspects, and embodiments of the present invention will be described in more detail with reference to the following drawings, in which.

DESCRIPTION OF THE PREFERRED EMBODIMENT

This invention will be described in further detail by way of examples with reference to the accompanying drawings.

Figure 1:
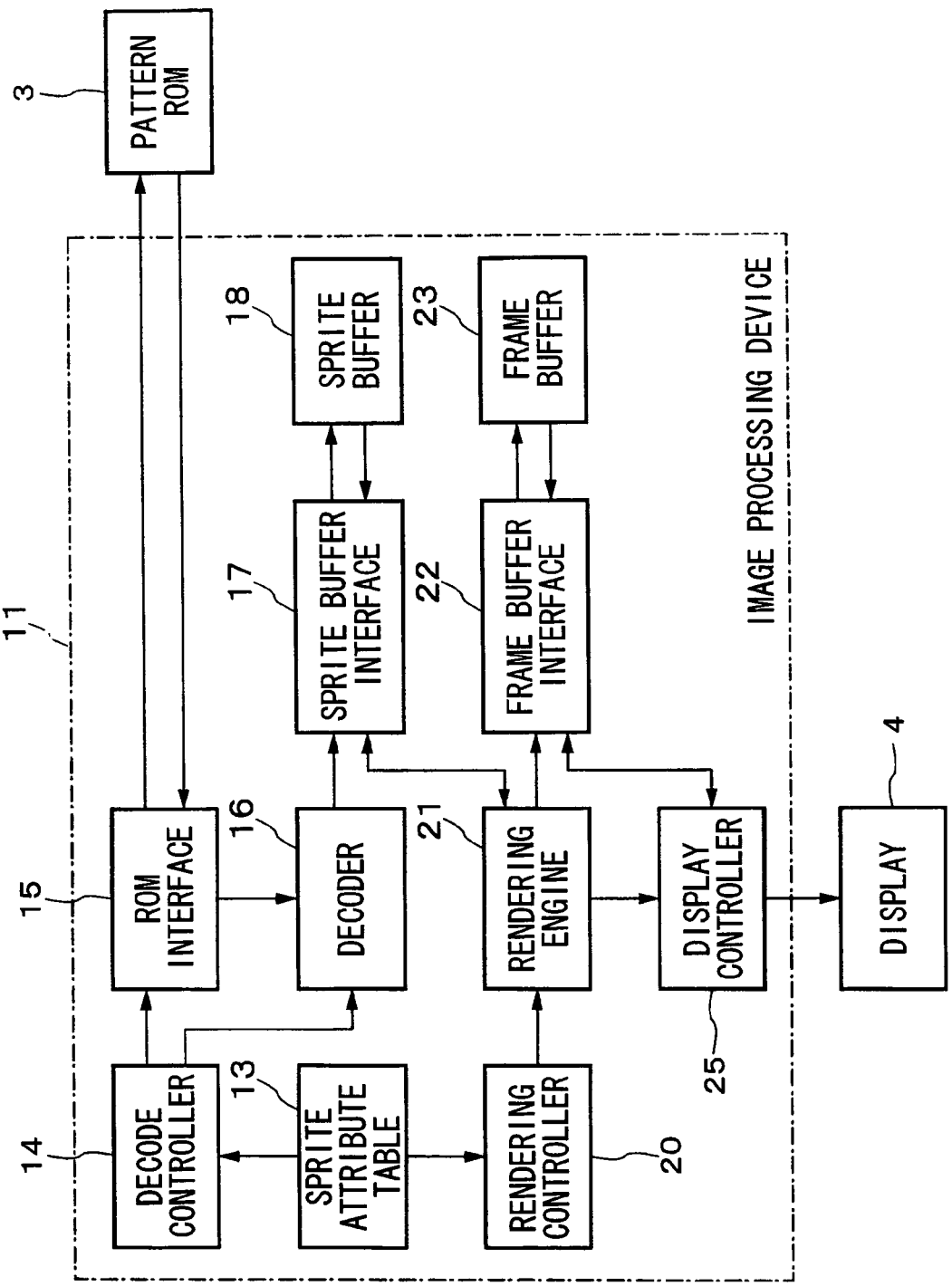
FIG. 1 is a block diagram showing the overall constitution of an image display device using an image processing device in accordance with a preferred embodiment of the invention.

FIG. 1 is a block diagram showing the overall constitution of an image display device using an image processing device 11 in accordance with a preferred embodiment of the invention. Reference numeral 13 designates a sprite attribute table with which sprite attribute data are registered under the control of a CPU (not shown). As sprite attribute data, there are provided addresses of a pattern ROM 3 for storing sprite patterns, parameters defining magnification, reduction, rotation, and deformation regarding sprite patterns, and other data for designating display positions on the screen of a display 4, for example. Reference numeral 14 designates a decode controller that controls decode processes on 'compressed' sprite patterns stored in the pattern ROM 3. Reference numeral 15 designates a ROM interface that outputs read addresses for the pattern ROM 3 so as to output sprite pattern data, read from the pattern ROM 3, to a decoder 16.

The decoder 16 performs decoding (i.e., expansion) on the sprite pattern data, read from the pattern ROM 3, so as to output decoded data to a sprite buffer interface 17. The sprite buffer interface 17 expands 'decoded' sprite patterns, output from the decoder 16, in a sprite buffer 18. Upon reception of instructions from a rendering engine 21, it reads 'expanded' sprite pattern data from the sprite buffer 18 so as to transfer them to the rendering engine 21. The sprite buffer 18 has a prescribed storage capacity capable of expanding a plurality of sprite patterns therein. Reference numeral 20 designates a rendering controller that reads sprite attribute data from the sprite attribute table 13 so as to transfer them to the rendering engine 21.

The rendering engine 21 performs rendering processes on sprite pattern data, read from the sprite buffer 18, in accordance with instructions from the rendering controller 20, so that rendering-completed data are supplied to a frame buffer interface 22. The frame buffer interface 22 draws rendering-completed data, output from the rendering engine 21, in a frame buffer 23. Upon reception of instructions from a display controller 25, it reads prescribed data from the frame buffer 23 so as to transfer them to the display controller 25. The frame buffer 23 is a memory into which data are written in correspondence with dots displayed on the screen of the display 4, wherein it specifically comprises a double-buffer configuration. The display controller 25 produces various timing signals for the image display, which are supplied to the display 4. In addition, it also outputs prescribed data read from the frame buffer 23 to the display 4 in synchronization with timing signals.

Next, the overall operation of the image display device 11 will be described with reference to flowcharts shown in FIGS. 2 and 3.

Figure 2:
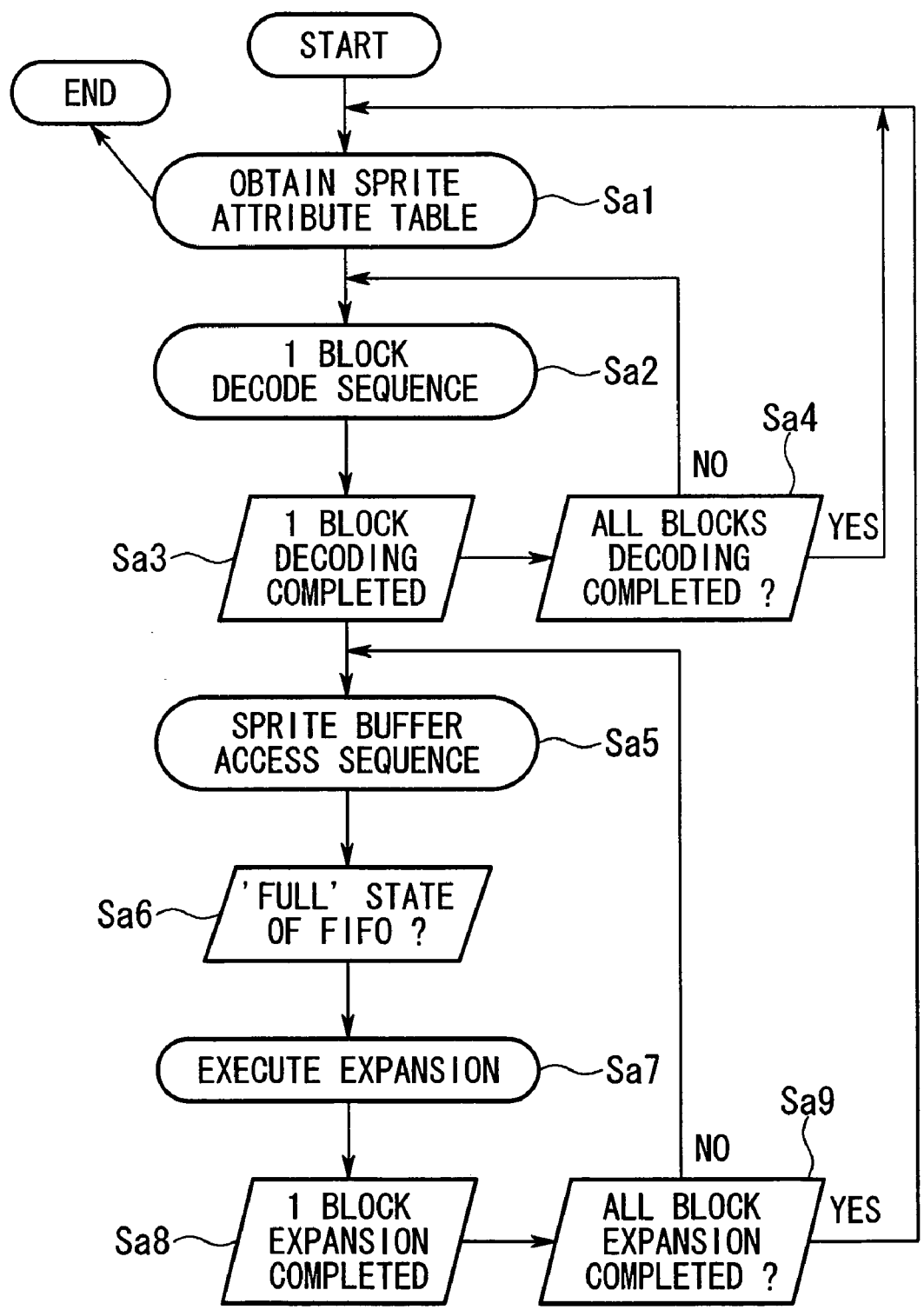
FIG. 2 is a flowchart showing procedures of decoding and expanding with respect to sprite pattern data.
Figure 3:
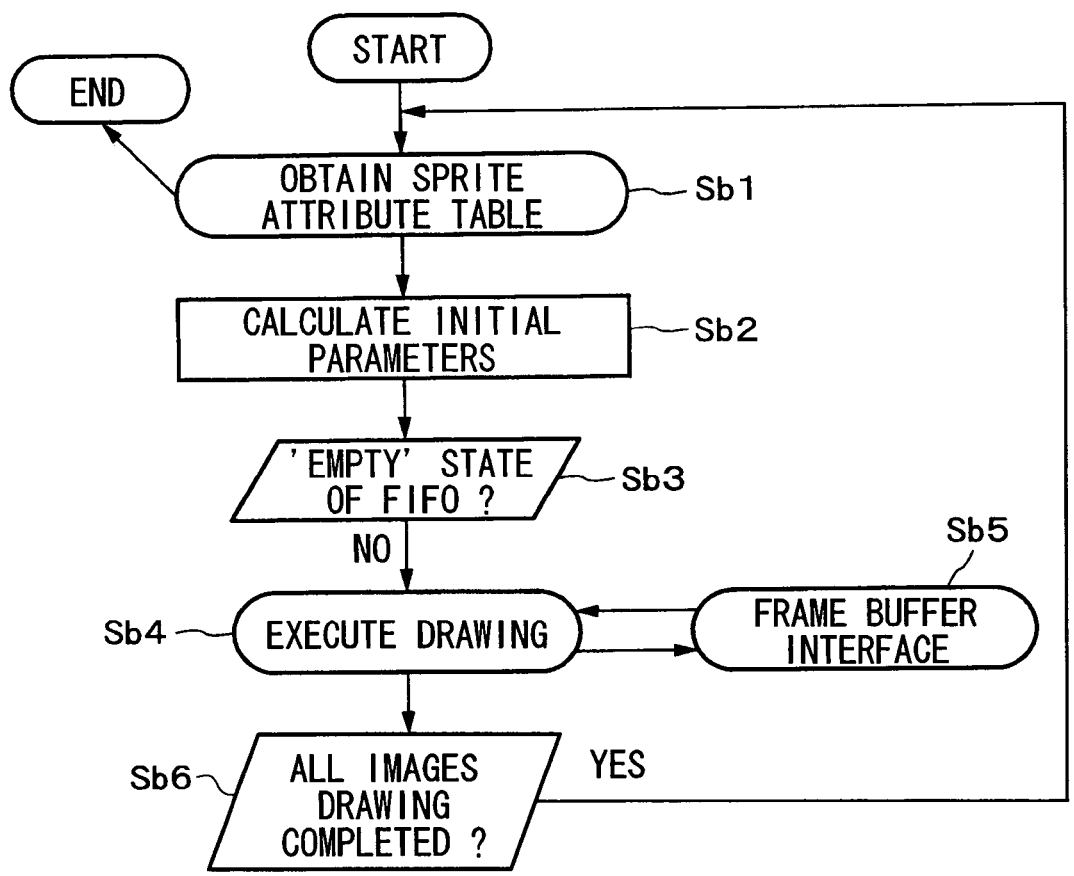
FIG. 3 is a flowchart showing procedures of drawing sprite patterns on a frame buffer associated with a display.

First, the decode controller 14 accesses the sprite attribute table 13 so as to obtain a prescribed address regarding a first sprite pattern stored in the pattern ROM 3 in step Sa1 shown in FIG. 2. Then, the decode controller 14 outputs the address to the ROM interface 15, whereby it instructs the ROM interface 15 to read one block of data, which corresponds to image data of 16×16 dots. Normally, each sprite pattern is constituted by 'n' blocks (where 'n' is an integer greater than '1') of sprite pattern data. Upon reception of the aforementioned instruction from the decode controller 14, the ROM interface 15 reads one block of sprite pattern data from the pattern ROM 3, so that the read sprite pattern data are supplied to the decoder 16. The decoder 16 decodes one block of sprite pattern data in step Sa2. After completion of decoding on one block of sprite pattern data (see step Sa3), the flow proceeds to step Sa4 in which a decision is made as to whether or not all blocks of sprite pattern data forming the first sprite pattern have been completely decoded. If not, the flow returns to step Sa2 again so that the ROM interface 15 reads the next block of sprite pattern data from the pattern ROM 3, whereby the decoder 16 performs decoding on the next block of sprite pattern data.

The aforementioned operations are repeatedly performed. When all of blocks of sprite pattern data forming the first sprite pattern are completely decoded so that the decision result of step Sa4 turns to 'YES', the flow returns to step Sa1 again so as to read from the sprite attribute table 13 an address regarding a next sprite pattern stored in the pattern ROM 3. Thereafter, the aforementioned operations are similarly repeated with regard to the next sprite pattern, which is thus decoded in the decoder 16.

When the decoder 16 completes decoding on the single block of sprite pattern data in step Sa3, the flow proceeds to step Sa5 in which the sprite buffer interface 17 expands the 'decoded' sprite pattern data in the sprite buffer 18. Herein, the sprite buffer 18 serves as a FIFO (first-in-first-out) memory so that the sprite pattern data are sequentially expanded in units of blocks. In step Sa6, the sprite buffer interface 17 makes a decision as to whether or not the sprite buffer 18 is set to a FULL state. If a decision result is 'NO', the flow proceeds to step Sa7 in which the sprite buffer interface 17 executes expansion on the sprite pattern data.

After completion of the expansion with respect to one block of sprite pattern data (see step Sa8), the flow proceeds to step Sa9 in which a decision is made as to whether or not all blocks of sprite pattern data forming the designated sprite pattern are completely expanded. If a decision result of step Sa9 is 'NO', the flow returns to step Sa5 again, whereby the sprite buffer interface 17 waits for the completion of decoding on the next block of sprite pattern data; then, it expands the next block of sprite pattern data in the sprite buffer 18. When the sprite buffer interface 17 completely expands all blocks of sprite pattern data in the sprite buffer 18 so that a decision result of step Sa9 turns to 'YES', the flow returns to step Sa1.

As described above, all sprite pattern data stored in the pattern ROM 3 are sequentially decoded in units of blocks and are then expanded in the sprite buffer 18 in accordance with the so-called FIFO method.

Next, a drawing process for the frame buffer 23 will be described in detail with reference to FIG. 3.

The rendering controller 20 reads sprite attribute data from the sprite attribute table 13 in step Sb1, wherein the sprite attribute data include parameters defining magnification, reduction, rotation, and deformation regarding sprite patterns, and other data such as data designating display positions on the screen. The read sprite attribute data are supplied to the rendering engine 21, which performs calculations based on parameters output from the rendering controller 20, thus producing initial parameters in step Sb2. In step Sb3, a decision is made as to whether or not the sprite buffer 18 is set to an EMPTY state. If not, the flow proceeds to step Sb4 in which the drawing process is performed.

Firstly, the rendering engine 21 instructs the sprite buffer interface 17 to read a sprite pattern from the sprite buffer 18. Upon reception of the instruction, the sprite buffer interface 17 reads sprite pattern data in correspondence with coordinates (or addresses), which are calculated by the rendering engine 21 based on the sprite attribute data. The read sprite pattern data are supplied to the rendering engine 21, which in turn output them to the frame buffer interface 22 together with display position data output from the rendering controller 20. Thus, the frame buffer interface 22 draws the sprite pattern data at the prescribed addresses corresponding to the display position data in steps Sb4 and Sb5.

The drawing process executed on the frame buffer 23 contains image processing regarding rotation and deformation. Hence, the EMPTY state of the sprite buffer 18 is confirmed in units of sprite patterns because the drawing process cannot be started unless all sprite pattern data regarding a single sprite pattern are expanded in the sprite buffer 18. When the sprite pattern is completely drawn so that a decision result of step Sb6 turns to 'YES', the flow returns to step Sb1 again, whereby the rendering controller 20 reads the next sprite attribute data from the sprite attribute table 13. Thereafter, the next sprite pattern will be subjected to drawing process based on the read sprite attribute data.

As described above, reading operations and writing operations are performed in an asynchronous manner with respect to the sprite buffer 18. The sprite buffer 18 has a relatively large storage capacity allowing multiple sprite patterns to be simultaneously expanded, wherein it is organized in accordance with the FIFO method so as to realize storage in units of blocks each consisting data of 16×16 dots. Therefore, unless the FIFO memory is set to the FULL state, it is possible to decode sprite pattern data regarding the next sprite pattern and to expand them in the sprite buffer 18 without waiting for the completion of drawing in the frame buffer 23. In addition, unless the FIFO memory is set to the EMPTY state, the rendering controller 20 can continue drawing in the frame buffer 23. Thus, it is possible to rapidly perform the decoding process for the sprite pattern data (stored in the pattern ROM 3) and the drawing process in the frame buffer 23 without considering differences of processing times (and processing timings) therebetween. As a result, it is possible to noticeably improve an ability of drawing processing.

Next, reading and writing operations for the frame buffer 23 will be described with reference to time charts shown in FIGS. 4A-4C, FIGS. 5A-5E, and FIGS. 6A-6E.

In order to draw an image by writing image data into the frame buffer 23, it is necessary to read sprite pattern data from the sprite buffer 18. The sprite buffer interface 17 gives a first priority in making an access for expansion of sprite pattern data in the sprite buffer 18 in order not to break the decoding process in progress in the decoder 16. Therefore, the sprite buffer interface 17 performs reading operations for reading sprite pattern data from the sprite buffer 18 in a prescribed time period in which it does not proceed to an access for expansion of sprite pattern data. This indicates that during such an expansion access period for expansion of sprite pattern data, it is impossible for the image processing device 11 to draw an image in association with the frame buffer 23.

The frame buffer interface 22 gives a first priority in making an access for displaying an image stored in the frame buffer 23 (i.e., an access for reading data from the frame buffer 23) in order to prevent noise from occurring on the screen of the display 4. This indicates that during such a display access period for display an image stored in the frame buffer 23, it is impossible for the image processing device 11 to draw an image in association with the frame buffer 23.

As described above, it is impossible to draw an image in association with the frame buffer 23 during both of the expansion access period for expanding sprite buffer data in the sprite buffer 18 and the display access period for displaying an image stored in the frame buffer 23. This reduces an ability to draw images in the frame buffer 23. In order to overcome such a drawback, the present embodiment is designed to match (or synchronize) the display access period of the frame buffer 23 with the expansion access period of the sprite buffer 18, whereby accessing is realized in substantially the same time period; thus, it is possible to noticeably improve an ability to draw images in the frame buffer 23.

Figure 4:
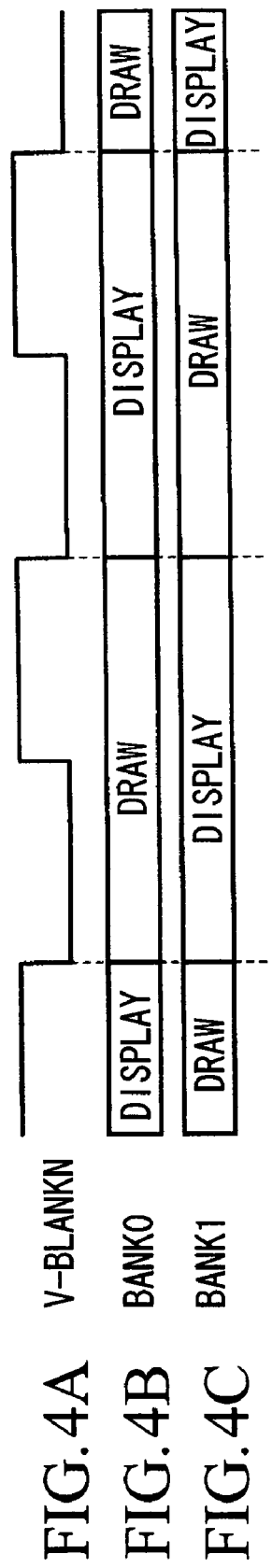
FIG. 4A is a time chart showing frame periods that are periodically switched over.
FIG. 4B is a time chart showing switchovers of display/draw operations with regard to one of double buffers forming a frame buffer shown in FIG. 1.
FIG. 4C is a time chart showing switchovers of display/draw operations with regard to the other of double buffers forming the frame buffer shown in FIG. 1.

FIGS. 4A to 4C are time charts showing switchovers of display/draw operations in the frame buffer 23 that is constituted by double buffers, wherein reference symbol 'V-BLANKN' (see FIG. 4A) shows timings regarding a frame period; 'BANK0' (see FIG. 4B) shows display/draw operations periodically switched over in one of the double buffers; and 'BANK1' (see FIG. 4C) shows display/draw operations periodically switched over in the other of the double buffers. Each of FIGS. 4B and 4C shows that a display operation and a draw operation are periodically switched over every single frame of display. Since a common bus line is provided for both of BANK0 and BANK1, it is impossible to simultaneously perform both of the display operation (or read operation) and draw operation by use of the frame buffer 23, regardless of its double-buffer constitution. Herein, the frame buffer 23 employs the double-buffer constitution in order to provide one frame for each draw period, whereby it is possible to prevent the stored content of the frame buffer 23 from being unexpectedly rewritten during the display period regarding a prescribed frame. Incidentally, the aforementioned functions of the present embodiment can be realized with ease even when the frame buffer 23 employs a single-buffer constitution.

FIGS. 5A to 5E are time charts for explaining display access timings for the frame buffer 23, wherein reference symbol 'HDSP' (see FIG. 5A) shows a horizontal display period of one line on the display screen, in which a low-level period represents a horizontal non-display period. Reference symbol 'DSPREQ' (see FIG. 5B) shows a request timing for requesting a display access (i.e., a display request), which is issued by the display controller 25 towards the frame buffer interface 22 with respect to prescribed data to be displayed in the next line next to the presently displayed line on the screen of the display 4 at an end timing of the display period of the present line. Herein, it is necessary for the frame buffer interface 22 to read display data of one line from the frame buffer 23 before the start timing of the display period of the next line. An expansion access for the sprite buffer 18 must occur at least one time in the horizontal non-display period except for an exceptional case (not specifically described herein). For this reason, the frame buffer interface 22 holds the aforementioned display request DSPREQ given from the display controller 25 for a while; then, it starts a display access (or a display acknowledge, see 'DSPACK' in FIG. 5C) at a leading-edge timing of an expansion access (or an open request, see 'OPENREQ' in FIG. 5D) with respect to the sprite buffer 18.

Figure 5:
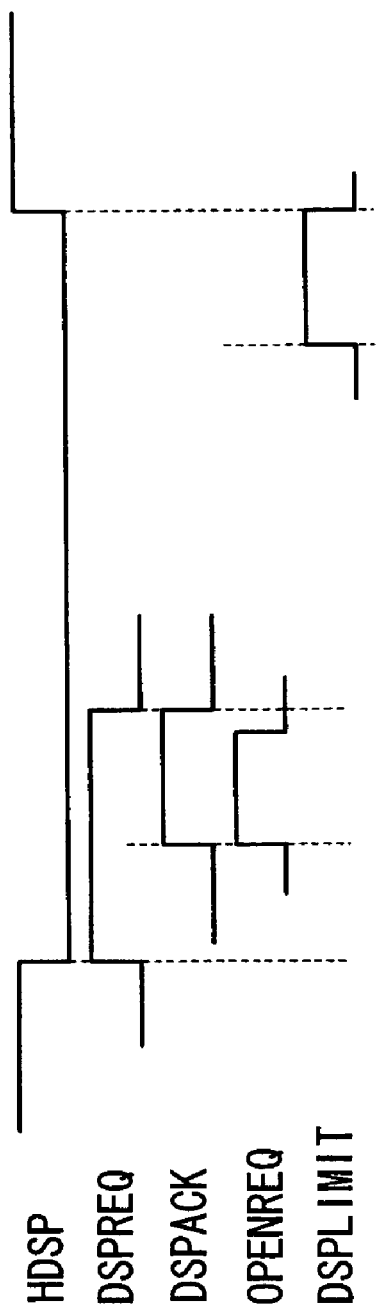
FIG. 5A is a time chart showing a horizontal display period (HDSP) of one line, wherein a low-level period represents a horizontal non-display period.
FIG. 5B is a time chart showing a display request (DSPREQ) from a display controller towards a frame buffer interface shown in FIG. 1.
FIG. 5C is a time chart showing a display access (DSPACK) with respect to the frame buffer.
FIG. 5D is a time chart showing an expansion access (OPENREQ) with respect to the sprite buffer.
FIG. 5E is a time chart showing a compulsory execution for the display access with respect to the frame buffer.
Figure 6:
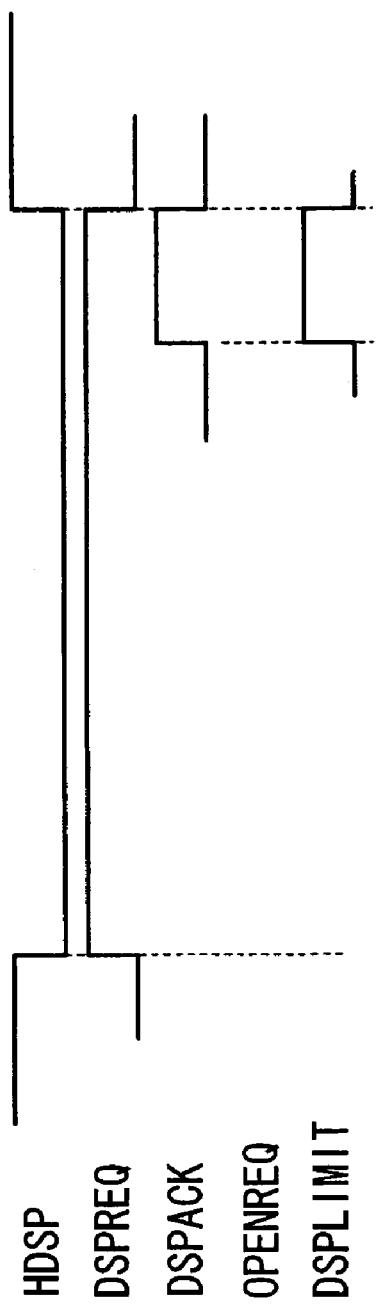
FIG. 6A is a time chart showing a horizontal display period (HDSP) of one line, wherein a low-level period represents a horizontal non-display period.
FIG. 6B is a time chart showing a display request (DSPREQ)
FIG. 6C is a time chart showing a display access (DSPACK) with respect to the frame buffer.
FIG. 6D is a time chart showing an expansion access (OPENREQ) with respect to the sprite buffer.
FIG. 6E is a time chart showing a compulsory execution for the display access with respect to the frame buffer.
Figure 7:
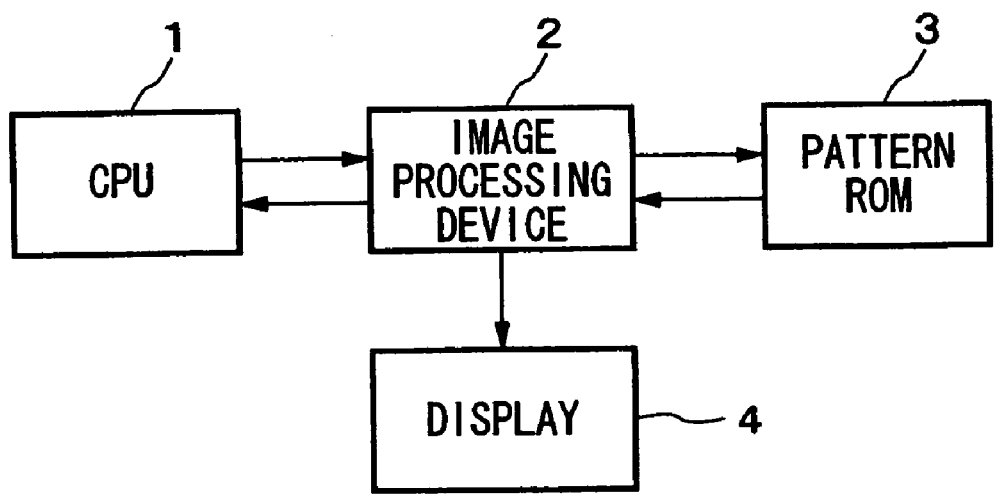
FIG. 7 is a block diagram showing the overall constitution of a conventionally-known image display device using sprites in image processing.

As shown in FIGS. 5C and 5D, it is possible to synchronize an expansion access (OPENREQ) for the sprite buffer 18 and a display access (DSPACK) for the frame buffer 23. When an expansion access period of the sprite buffer 18 substantially matches a display access period of the frame buffer 23, it is possible to substantially match their end timings; thus, it is possible to restart drawing for the frame buffer 23 without breaks just after end timings of these periods. In addition, the present embodiment allows the frame buffer interface 22 to draw an image in association with the frame buffer 23 during a standby period for holding the aforementioned display request (DSPREQ) given from the display controller 25; therefore, it is possible to reliably increase the overall drawing time in this invention compared with the conventional technology.

FIGS. 6A to 6E are timing charts which illustrate the timing of executing the compulsory expansion. As illustrated in FIGS. 6A-6E, at the timing for reading display data of one line, which is backwardly counted from the start timing of the horizontal display period, under the condition where no expansion access occurs with respect to the sprite buffer 18, in spite of existence or non-existence of an expansion access for the sprite buffer 18, the frame buffer interface 22 compulsorily executes a display access with respect to the frame buffer 23. The reference symbol 'DSPLIMIT' shows the compulsory execution timing of the display access described above. Thus, in contrast to FIGS. 5A to 5E, even when no expansion access (see FIG. 6D) may exceptionally occur with respect to the sprite buffer 18, it is possible for the frame buffer interface 22 to execute the display access (see FIG. 6E) for the frame buffer 23 without error.

As described heretofore, this invention has a variety of effects and technical features, which will be described below.

(1) An image processing device of this invention is designed to perform read/write controls with respect to a sprite buffer that is constituted as a FIFO memory, whereby it is possible to perform a decoding process of compressed image data and a writing process of a frame buffer without considering differences between their processing times. Thus, it is possible to noticeably improve an image processing ability.

(2) In other words, a writing operation for the sprite buffer is synchronized with a reading operation for the frame buffer, whereby it is possible to minimize a dead time due to read/write operations for them. This increases a draw-enable time for the frame buffer to be longer compared with the conventional one; thus, it is possible to noticeably improve an image processing ability.

(3) In a first aspect of this invention, an image processing device comprises a decoder for decoding compressed image data to restore original image data before compression, a write means for writing the decoded image data (i.e., sprite pattern data) into a first storage means (i.e., a sprite buffer), a read means for reading the data from the first storage means, a control means for performing prescribed processing (i.e., rendering) on the read data and for writing the processed data (i.e., display data) into a second storage means (i.e., a frame buffer), and a display control means for reading the display data from the second storage means so as to output them to a display, wherein the write means and the read means (i.e., sprite buffer interface) performs write and read controls on the first storage means to serve as a FIFO memory.

(4) In a second aspect of this invention, an image processing device comprises a memory (i.e., a pattern ROM) for storing 'compressed' sprite pattern data, a sprite attribute table for storing attributes of sprite patterns, a decoder for reading sprite pattern data from the memory and for decoding them to restore original image data with reference to the stored content of the sprite attribute table, a write means for writing the decoded data into a first storage means (i.e., a sprite buffer), a read means for reading the data from the memory, a control means for performing prescribed processing (i.e., rendering) on the read data based on the stored content of the sprite attribute table and for writing the processed data (i.e., display data) into a second storage means (i.e., a frame buffer), and a display control means for reading the display data from the second storage means so as to output them to a display, wherein the write means and the read means performs write and read controls on the first storage means, which is treated as a FIFO memory.

(5) In the above, the prescribed processing correspond to rendering such as magnification, reduction, rotation, and deformation with respect to images to be displayed on the display screen.

(6) In a third aspect of this invention, an image processing device comprises a decoder for decoding compressed image data to restore original image data before compression, a write means for writing the decoded data (i.e., sprite pattern data) into a first storage means, a read means for reading the data from the first storage means, a control means for performing prescribed processing (i.e., rendering) on the read data from the first storage means and for writing the processed data (i.e., display data) into a second storage means, and a display control means for reading the display data from the second storage means so as to output them to a display, wherein the display control means realizes synchronization such that the write timing at which the write means writes the data into the first storage means with the timing of reading the display data from the second storage means.

(7) In a fourth aspect of this invention, an image processing device comprises a memory for storing compressed image data (representing sprite patterns), a sprite attribute table for storing attributes of sprite patterns, a decoder for reading the compressed image data from the memory and for decoding them to restore sprite pattern data with reference to the stored content of the sprite attribute table, a write means for writing the decoded data into a first storage means (i.e., a sprite buffer), a read means for reading the data from the first storage means, a control means for performing prescribed processing (i.e., rendering) on the read data from the first storage means based on the stored content of the sprite attribute table and for writing the processed data (i.e., display data) into a second storage means, and a display control means for reading the data from the display data from the second storage means so as to output them to a display, wherein the display control means realizes synchronization such that the timing of the write means for writing the data into the first storage means is synchronized with the timing of reading the display data from the second storage means.

(8) In the above, in a time period in which the sprite pattern data are not written into the first storage means, the display control means starts to read the display data from the second storage means at the timing that allows the display data of one line to be read out and that is counted backwardly from the start timing of the horizontal display period of the display. In addition, the prescribed processing correspond to rendering such as magnification, reduction, rotation, and deformation with respect to images to be displayed on the display screen.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. An image processing device comprising:
   a first reading device for making a read access to a memory that stores a plurality of compressed image data, each of which is comprised of a plurality of blocks each having a predetermined size in advance, so as to read the compressed image data block-by-block;
   a decoder for decoding the compressed image data block-by-block so as to produce decompressed image data;
   a first storage device serving as a first-in-first-out memory, which is given a priority in a write operation for writing the decompressed image data therein rather than a read operation for reading the decompressed image data therefrom, and is incapable of simultaneously performing the write operation and the read operation and has a storage area operable for storing a plurality of decompressed image data decoded by the decoder;
   a writing device for writing the decompressed image data into the first storage device block-by-block;
   a second reading device for reading the decompressed image data from the first storage device;
   a second storage device that is given a priority in a read operation for reading therefrom rather than a write operation for writing therein and is incapable of simultaneously performing the read operation and the write operation;
   a control device for performing prescribed processing on the image data read from the first storage device and for writing the processed image data into the second storage device; and
   a display device for reading the processed image data from the second storage device and for displaying an image based on the processed image data.

2. An image processing device comprising:
   a sprite attribute table for storing sprite attributes;
   a first reading device for making a read access to a memory that stores a plurality of compressed image data, each of which is comprised of a plurality of blocks each having a predetermined size, in advance, so as to read the compressed image data block-by-block with reference to the sprite attribute table;
   a decoder for decoding the compressed image data block-by-block so as to produce sprite pattern data;
   a first storage device which serves as a first-in-first-out memory which is given a priority in a write operation for writing the sprite pattern data therein rather than a read operation for reading the sprite pattern data therefrom, which is incapable of simultaneously performing the write operation and the read operation, and which has a storage area operable for storing a plurality of decompressed image data decoded by the decoder;
   a writing device for writing the sprite pattern data into the first storage device block-by-block;
   a second reading device for reading the sprite pattern data from the first storage device;
   a second storage device which is given a priority in a read operation for reading therefrom rather than a write operation for writing therein, and which is incapable of simultaneously performing the read operation and the write operation;
   a control device for performing prescribed processing on the sprite pattern data read from the first storage device and for writing the processed sprite pattern data into the second storage device; and
   a display device for reading the processed sprite pattern data from the second storage device and for displaying an image based on the processed sprite pattern data.

3. An image processing device according to claim 1, wherein the prescribed processing corresponds to rendering actualizing at least one of magnification, reduction, rotation, or deformation with respect to the image data.

4. An image processing device according to claim 2, wherein the prescribed processing corresponds to rendering actualizing at least one of magnification, reduction, rotation, or deformation with respect to the sprite pattern data.

5. An processing method comprising:
   making a read access to a memory that stores a plurality of compressed image data, each of which is comprised of a plurality of blocks each having a predetermined size in advance, so as to read the compressed image data block-by-block by referring to a sprite attribute table;
   decoding the compressed image data block-by-block so as to produce sprite pattern data;
   writing the sprite pattern data into a first storage block-by block, wherein the first storage serves as a first-in-first-out memory, which is given a priority in a write operation for writing the sprite pattern data therein rather than a read operation for reading the sprite pattern data therefrom, which is incapable of simultaneously performing the write operation and the read operation, and which has a storage area operable for storing a plurality of decompressed image data decoded by the decoder;
   reading the sprite pattern data from the first storage;
   performing prescribed processing on the sprite pattern data read from the first storage so as to write the processed sprite pattern data into a second storage, which is given a priority in a read operation for reading therefrom rather than a write operation for writing therein and is incapable of simultaneously performing the read operation and the write operation; and reading the processed sprite pattern data from the second storage and displaying an image based on the processed sprite pattern data.

6. An image processing device comprising:

a decoder for decoding compressed image data, each of which is compressed in advance, thus producing decompressed image data;

a first storage device which is given a priority in a write operation for writing the decompressed image data therein rather than a read operation for reading decompressed image data therefrom and which is incapable of simultaneously performing the write operation and the read operation;

a writing device for writing the decompressed image data into the first storage device;

a reading device for reading the decompressed image data from the first storage device;

a second storage device, which is given a priority in a read operation for reading therefrom rather than a write operation for writing therein, and which is incapable of simultaneously performing the read operation and the write operation;

a control device for performing prescribed processing on the image data read from the first storage device and for writing the processed image data into the second storage device; and a display device for reading the processed image data from the second storage device, and for displaying an image based on the processed image data, wherein the display device does not start making a read access to the second storage device until the writing device starts making a write access to the first storage device, and the display device starts making the read access to the second storage device when the writing device starts making the write access to the first storage device.

7. An image processing device comprising:

a sprite attribute table for storing sprite attributes;

a decoder for decoding compressed image data, which is compressed in advance, by referring to the sprite attribute table thus producing sprite pattern data;

a first storage device, which is given a priority in a write operation for writing the decompressed image data therein rather than a read operation for reading the decompressed image data therefrom, and which is incapable of simultaneously performing the write operation and the read operation;

a writing device for writing the sprite pattern data into the first storage device;

a reading device for reading the sprite pattern data from the first storage device;

a second storage device, which is given a priority in a read operation for reading therefrom rather than a write operation for writing therein, and which is incapable of simultaneously performing the read operation and the write operation;

a control device for performing prescribed processing on the sprite pattern data read from the first storage device by referring to the sprite attribute table, and for writing the processed sprite pattern data into the second storage device; and a display device for reading the processed sprite pattern data from the second storage device and for displaying an image based on the processed sprite pattern data, wherein the display device does not start making a read access to the second storage device until the writing device starts making a write access to the first storage device, and the display device starts making the read access to the second storage device when the writing device starts making the write access to the first storage device.

8. An image processing device according to claim 6, wherein the display device compulsorily makes the read access to the second storage device at a timing allowing one line of data to be read out in a horizontal display period in which the write access is not made to the first storage device.

9. An image processing device according to claim 7, wherein the display device compulsorily makes the read access to the second storage device at a timing within a horizontal display period when the write access is not made to the first storage device until the timing within the horizontal display period has come.

10. An image processing device according to claim 6, wherein the prescribed processing corresponds to rendering actualizing at least one of magnification, reduction, rotation, and deformation with respect to the image data.

11. An image processing device according to claim 7, wherein the prescribed processing corresponds to rendering actualizing at least one of magnification, reduction, rotation, and deformation with respect to the sprite pattern data.

12. An image processing method comprising: decoding compressed image data, which is compressed in advance, by referring to a sprite attribute table storing sprite attributes thus producing sprite pattern data;

writing the sprite pattern data into a first storage device, wherein the first storage device is given a priority in a write operation for writing the decompressed image data therein rather than a read operation for reading the decompressed image data therefrom, and which is incapable of simultaneously performing the write operation and the read operation;

reading the sprite pattern data from the first storage device;

performing prescribed processing on the sprite pattern data read from the first storage device by referring to the sprite attribute table, and writing the processed sprite pattern data into a second storage device, which is given a priority in a read operation for reading therefrom rather than a write operation for writing therein and is incapable of simultaneously performing the read operation and the write operation; and reading the processed sprite pattern data from the second storage device and displaying an image based on the processed sprite pattern data, wherein a read access is not started until a write access is made to the first storage device, and the read access is made to the second storage device when the write access is made to the first storage device.

13. An image processing device according to claim 9, wherein the timing is determined based on a time period required for reading out one line of the processed sprit pattern data from the second storage device.

* * * * *